US012354303B2

(12) United States Patent
Cheng et al.

(10) Patent No.: US 12,354,303 B2
(45) Date of Patent: Jul. 8, 2025

(54) QUANTITATIVE EVALUATION METHOD AND SYSTEM FOR PREDICTION RESULT OF REMOTE SENSING INVERSION

(71) Applicants: Central South University, Changsha (CN); Hunan University of Technology and Business, Changsha (CN)

(72) Inventors: Gong Cheng, Changsha (CN); Xiaoqing Deng, Changsha (CN); Yuying Ban, Changsha (CN); Dan Luo, Changsha (CN); Huikun Huang, Changsha (CN); Zixuan Wang, Changsha (CN); Zhanjun Zhu, Changsha (CN); Jiaxuan Li, Changsha (CN); Dongjun Wang, Changsha (CN)

(73) Assignees: Central South University, Changsha (CN); Hunan University of Technology and Business, Changsha (CN)

( * ) Notice: Subject to any disclaimer, the term of this patent is extended or adjusted under 35 U.S.C. 154(b) by 378 days.

(21) Appl. No.: 18/072,384

(22) Filed: Nov. 30, 2022

(65) Prior Publication Data

US 2023/0169681 A1      Jun. 1, 2023

(30) Foreign Application Priority Data

Dec. 1, 2021     (CN) ........................ 202111450618.4

(51) Int. Cl.
*G06T 7/73*      (2017.01)
*G06V 10/25*     (2022.01)
(Continued)

(52) U.S. Cl.
CPC ................ *G06T 7/73* (2017.01); *G06V 10/25* (2022.01); *G06V 10/761* (2022.01);
(Continued)

(58) Field of Classification Search
CPC . G06T 2207/10032; G06T 2207/30181; G06T 7/0002; G06V 10/56; G06V 10/82;
(Continued)

(56) References Cited

U.S. PATENT DOCUMENTS

| 11,125,619 B2* | 9/2021 | Murphy | G01J 3/0208 |
| 2015/0355353 A1* | 12/2015 | Whitaker | G01V 20/00 |
| | | | 702/14 |
| 2022/0099855 A1* | 3/2022 | Di | G01V 1/345 |

FOREIGN PATENT DOCUMENTS

CN       111398562 A  *  7/2020 ............. G01N 21/17

OTHER PUBLICATIONS

Jiang G, Zhou S, Cui S, Chen T, Wang J, Chen X, Liao S, Zhou K. Exploring the Potential of HySpex Hyperspectral Imagery for Extraction of Copper Content. Sensors (Basel). Nov. 6, 2020;20(21):6325. doi: 10.3390/s20216325. PMID: 33171902; PMCID: PMC7664244. (Year: 2020).*

(Continued)

*Primary Examiner* — Stephen R Koziol
*Assistant Examiner* — Joshua Chen
(74) *Attorney, Agent, or Firm* — DITTHAVONG, STEINER & MLOTKOWSKI (57) ABSTRACT

The present disclosure provides a quantitative accuracy evaluation method and system for a result of remote sensing inversion. The method includes the following steps: acquiring measured data of a target element content in a preset zone; acquiring, based on acquired remote sensing image reflectivity of the preset zone, predicted data of the target element content in the preset zone by a remote sensing inversion model; and conducting comprehensive index evaluation of abnormal feature similarity between the measured data and the predicted data. The technical solution adopted in the present disclosure can solve the problem with quantitative accuracy evaluation of remote sensing inversion (Continued)

that inverted object content and measured object content are distributed inconsistently in space.

3 Claims, 7 Drawing Sheets

(51) Int. Cl.
  *G06V 10/60* (2022.01)
  *G06V 10/74* (2022.01)
  *G06V 10/77* (2022.01)
  *G06V 10/776* (2022.01)
  *G06V 10/82* (2022.01)
  *G06V 20/13* (2022.01)
(52) U.S. Cl.
  CPC ........ *G06V 10/7715* (2022.01); *G06V 10/776* (2022.01); *G06T 2207/10032* (2013.01)
(58) Field of Classification Search
  CPC ........ G06V 10/98; G06V 10/60; G06V 20/13; G06Q 10/06393; G06Q 10/04
  See application file for complete search history.

(56) References Cited

OTHER PUBLICATIONS

Jiang G, Zhou S, Cui S, Chen T, Wang J, Chen X, Liao S, Zhou K. Exploring the Potential of HySpex Hyperspectral Imagery for Extraction of Copper Content. Sensors (Basel). Nov. 6, 2020;20(21):6325. doi: 10.3390/s20216325. PMID: 33171902; PMCID: PMC7664244. (Year: 2020) (Year: 2020).*

* cited by examiner

QUANTITATIVE EVALUATION METHOD AND SYSTEM FOR PREDICTION RESULT OF REMOTE SENSING INVERSION

CROSS REFERENCE TO RELATED APPLICATION

This patent application claims the benefit and priority of Chinese Patent Application No. 202111450618.4, filed with the China National Intellectual Property Administration on Dec. 1, 2021, the disclosure of which is incorporated by reference herein in its entirety as part of the present application.

TECHNICAL FIELD

The present disclosure belongs to the technical field of remote sensing inversion, and particularly relates to an accuracy evaluation method and system for a result of remote sensing inversion based on spatial information similarity.

BACKGROUND

With the continuous innovation in modeling and the improvement of the accuracy of remote sensing data, a growing number of studies are focusing on the inversion of element content using remote sensing data. Meanwhile, the quantitative accuracy evaluation for results of remote sensing inversion has been widely used. Regarding the quantitative accuracy evaluation for results of remote sensing inversion, the most essential task is to evaluate the inversion accuracy, stability and consistency, namely to evaluate the similarity between a measured value and a predicted value. Quantitative accuracy evaluation includes the evaluation of an inversion model, the evaluation of the difference between the measured value and the predicted value, and the evaluation of visualized spatial information of measured values and predicted values in a preset zone.

In the prior art, a quantitative index method is proposed to evaluate the accuracy of remote sensing inversion using evaluation indexes such as R-Squared ($R^2$), Root Mean Squared Error (RMSE) and Mean Absolute Error (MAE), which are based on discrete samples and are usually used to test the accuracy of the inversion model. However, this method tests the model mainly depending on theory, so it is impossible to eliminate false abnormal areas, resulting in a good evaluation accuracy of the results, but poor results after visualization. Further, a quantitative method for evaluating a result of remote sensing inversion is proposed, which directly uses visual check to compare consistency in positions of high-value regions. However, this method is only applicable to comparison of small regions, but may incur huge manpower and material resources when applied to larger preset zones. In addition, another calculation and evaluation method based on image similarity is also proposed, which generally uses hash algorithm to calculate the similarity between images. During calculation, an image is regarded as a two-dimensional signal and the whole image is subject to pervasive computing. However, this method cannot achieve consistency and stability testing of abnormal regions, namely the high-value regions, which is needed in the practical application of remote sensing inversion.

To sum up, the foregoing methods of evaluating the similarity of the accuracy of results of remote sensing inversion in the prior art mostly adopt model evaluation index and field verification. The former cannot evaluate the actual inversion effect, while the latter consumes manpower and material resources. Therefore, a method of geostatistical interpolation is considered to visualize the measured data and the predicted data and calculate the image similarity. However, the existing similarity calculation methods are based on the similarity calculation of the whole image, and cannot selectively calculate high-value regions according to demand, which results in the inconsistency of the spatial distribution of inverted and measured object content during quantitative accuracy evaluation of remote sensing inversion, and meanwhile has certain subjectivity and limitations.

SUMMARY

A technical problem to be solved by the present disclosure is to provide an accuracy evaluation method and system for a result of remote sensing inversion based on spatial information similarity, so as to solve the problem with quantitative accuracy evaluation of remote sensing inversion that the inverted object content and measured object content are distributed inconsistently in space.

To achieve the above objective, the present disclosure uses the following technical solution:

The present disclosure provides a quantitative accuracy evaluation method for a result of remote sensing inversion, the method including the following steps:
  acquiring measured data of a target element content in a preset zone;
  acquiring, based on acquired remote sensing image reflectivity of the preset zone, predicted data of the target element content in the preset zone by a remote sensing inversion model; and
  conducting comprehensive index evaluation of abnormal feature similarity between the measured data and the predicted data.

Preferably, the comprehensive index evaluation covers: evaluation accuracy based on a quantity of high-value regions, evaluation accuracy based on a distance of high-value regions and evaluation accuracy based on an area of the high-value regions.

Preferably, the evaluation accuracy based on a quantity of high-value regions is acquired by comparing high-value regions of the predicted data with high-value regions of the measured data, counting the quantity of the high-value regions of the predicted data and the quantity of the high-value regions of the measured data, and calculating a predicted correct rate, a predicted false rate and a predicted missing rate.

Preferably, the evaluation accuracy based on a distance of high-value regions is acquired by determining whether similarity exists in distribution locations of the high-value regions of the predicted data and the high-value regions of the measured data.

Preferably, the evaluation accuracy based on an area of the high-value regions is acquired by calculating a degree of area overlapping of the high-value regions of the predicted data and the high-value regions of the measured data based on a range of the preset zone.

The present disclosure further provides a quantitative accuracy evaluation system for a result of remote sensing inversion, the system including:
  an acquisition module configured to acquire measured data of a target element content in a preset zone;
  an inversion module configured to acquire, based on acquired remote sensing image reflectivity of the preset zone, predicted data of the target element content in the preset zone by a remote sensing inversion model; and an evaluation module configured to conduct comprehensive index evaluation of abnormal feature similarity on the measured data and predicted data.

Preferably, the comprehensive index evaluation covers: evaluation accuracy based on a quantity of high-value regions, evaluation accuracy based on a distance of high-value regions and evaluation accuracy based on an area of the high-value regions.

Preferably, the evaluation module includes:
a counting unit configured to count the quantity of high-value regions of the predicted data and the quantity of high-value regions of the measured data; and
a first calculation unit configured to calculate a predicted correct rate, a predicted false rate and a predicted missing rate according to the quantity of the high-value regions, so as to acquire evaluation accuracy based on the quantity of the high-value regions.

Preferably, the evaluation module further includes:
a first acquisition unit configured to acquire the high-value regions of the predicted data and the high-value regions of the measured data; and
a second calculation unit configured to determine whether similarity exists in distribution locations of the high-value regions of the predicted data and the high-value regions of the measured data, so as to acquire the evaluation accuracy based on a distance of high-value regions.

Preferably, the evaluation module further includes:
a second acquisition unit configured to acquire a range of the preset zone; and
a third calculation unit configured to calculate a degree of area overlapping of the high-value regions of the predicted data and the high-value regions of the measured data based on a range of the preset zone, so as to acquire the evaluation accuracy based on an area of the high-value regions.

The quantitative accuracy evaluation method and system for a result of remote sensing inversion according to the present disclosure overcomes defects in the prior art that a conventional evaluation model is merely based on numerical evaluation; measured results and predicted results can both be visualized, and overall evaluation is conducted; and besides, a variety of evaluation indexes are adopted, such that evaluation results are more reliable.

DETAILED DESCRIPTION OF THE EMBODIMENTS

To make the above-mentioned objective, features, and advantages of the present disclosure clearer and more comprehensible, the present disclosure will be further described in detail below in conjunction with the accompanying drawings and specific embodiments.

Embodiment 1

Figure 1:
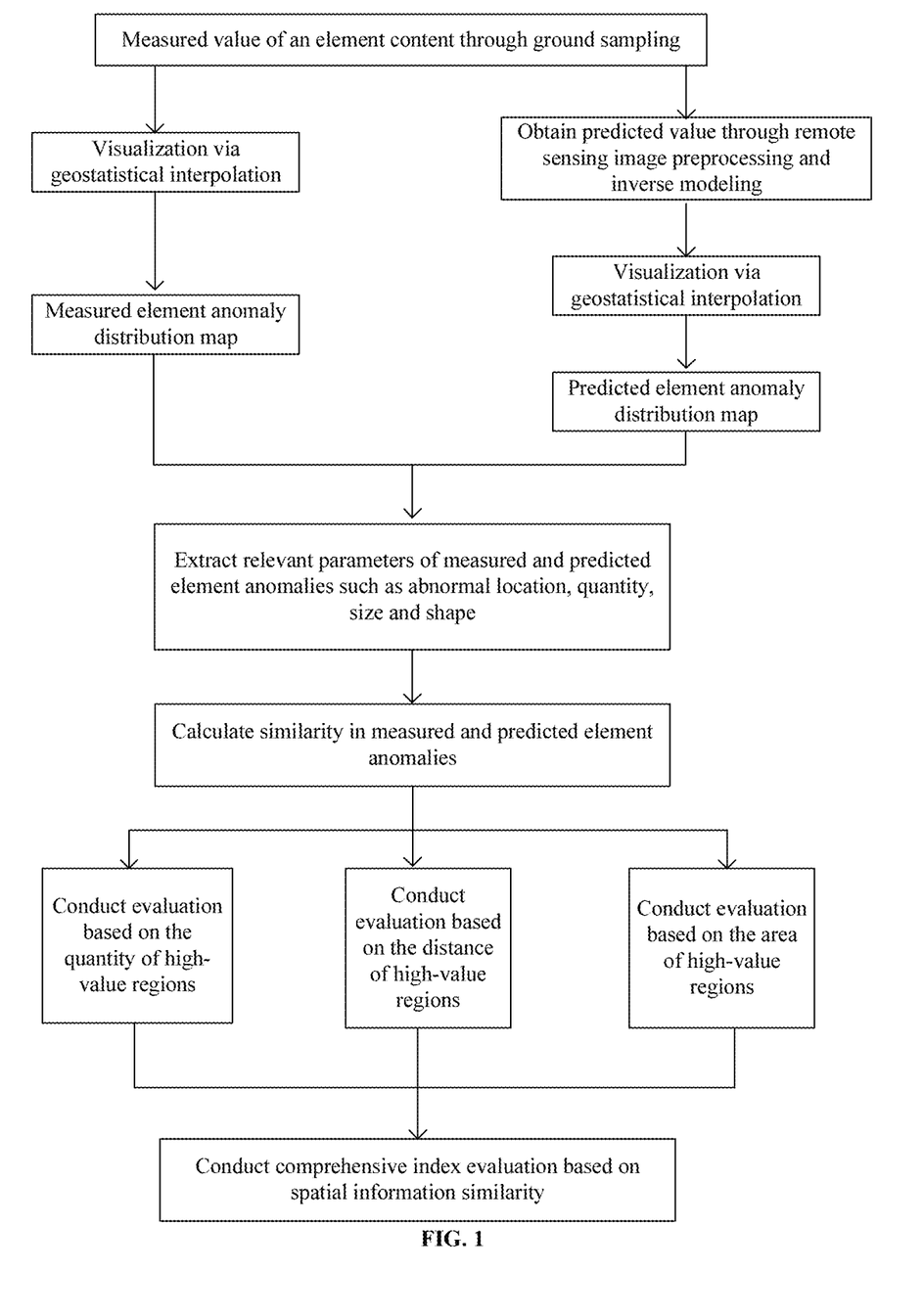
FIG. 1 is a flowchart of a quantitative accuracy evaluation method for a result of remote sensing inversion according to an embodiment of the present disclosure.

As shown in FIG. 1, an embodiment of the present disclosure provides a quantitative accuracy evaluation method for a result of remote sensing inversion, the method including the following steps:

Acquire measured data of a target element content in a preset zone;

Acquire, based on acquired remote sensing image reflectivity of the preset zone, predicted data of the target element content in the preset zone by a remote sensing inversion model, where the remote sensing inversion model is configured to establish a corresponding relationship between remote sensing image reflectivity and an element content of a measured point;

Conduct visualized interpolation color segmentation on the measured data using a geostatistical method to obtain a measured element anomaly distribution map; process remote sensing data using the remote sensing inversion model to obtain a predicted element content; and conduct interpolation and color segmentation using a geostatistical method for visualization to obtain a predicted element anomaly distribution map;

regarding the high-value regions of measured data and predicted data, extract the relevant parameters of measured and predicted element anomalies such as abnormal location, quantity, size and shape, where the relevant parameters are configured to calculate the similarity between measured and predicted element anomalies;

conduct comprehensive index evaluation of abnormal feature similarity between the measured data and the predicted data, where the comprehensive index evaluation covers: evaluation accuracy based on a quantity of high-value regions, evaluation accuracy based on a distance of high-value regions and evaluation accuracy based on an area of the high-value regions.

As an implementation of the present disclosure, the evaluation accuracy based on a quantity of high-value regions is acquired by comparing high-value regions of the predicted data with high-value regions of the measured data, counting the quantity of the high-value regions of the predicted data and the quantity of the high-value regions of the measured data, and calculating a predicted correct rate, a predicted false rate and a predicted missing rate; and the correct rate, the false rate and the missing rate are obtained according to the following formula:

$$P_{Correct} = \frac{a_c}{A_m}$$

$$P_{False} = \frac{a_f}{a_c + a_f}$$

$$P_{Missing} = \frac{a_m}{A_m}$$

Where $P_{correct}$ denotes a correct rate, $P_{False}$ denotes a false rate, and $P_{Missing}$ denotes a missing rate; $a_c$ denotes a quantity of high-value regions that is correctly inverted, of denotes a quantity of high-value regions falsely inverted, $a_m$ denotes a quantity of high-value regions that fails to be inverted, and $A_m$ denotes a quantity of measured high-value regions of an element; and $P_{Correct}$, $P_{False}$ and $P_{Missing}$ each have a value range of [0, 1].

As an implementation of the present disclosure, the evaluation accuracy based on a distance of high-value regions is acquired by determining whether similarity exists in distribution locations of the high-value regions of the predicted data and the high-value regions of the measured data, which is expressed as follows:

$$Dist=\sqrt{(x_i-x_j)^2+(y_i-y_j)^2}$$

Where Dist denotes a distance between centroids, $x_i$ and $y_i$ denote horizontal and vertical coordinates of a centroid in a measured high-value region, respectively, and $x_j$ and $y_j$ denote horizontal and vertical coordinates of a centroid in a predicted high-value region; the smaller the distance between centroids is, the higher the positional accuracy becomes.

As an implementation of the present disclosure, the evaluation accuracy based on an area of the high-value regions is acquired by calculating a degree of area overlapping of the high-value regions of the predicted data and the high-value regions of the measured data based on a range of the preset zone. Obtain the overlap index according to the following formula:

$$P_{OF} = \frac{S_{M \cap P}}{S_M}$$

Where $S_{M \cap P}$ denotes an area of an intersecting region of measured and predicted high-value regions, where SM denotes an area of the measured high-value regions; $P_{OF}$ has a value range of [0,1], and 0.5 is usually taken as the threshold; when $S_{M \cap P}$ is 0 and $P_{OF}=0$, it indicates that the two high-value regions are separated and there is no intersecting region; the closer the $P_{OF}$ is to 1, the larger the overlap area between the two regions is, and the higher the accuracy becomes.

For the accuracy evaluation on inversion results of the above three aspects of quantity, distance and area, a comprehensive evaluation (namely comprehensive evaluation based on abnormal feature similarity) index is finally obtained according to the following formula:

$$P = \frac{P_1 + P_2 + \ldots\ldots + P_N}{N}$$

Where $P_N$ denotes an Nth individual evaluation index, and P denotes a comprehensive evaluation index.

Embodiment 2

Figure 2:
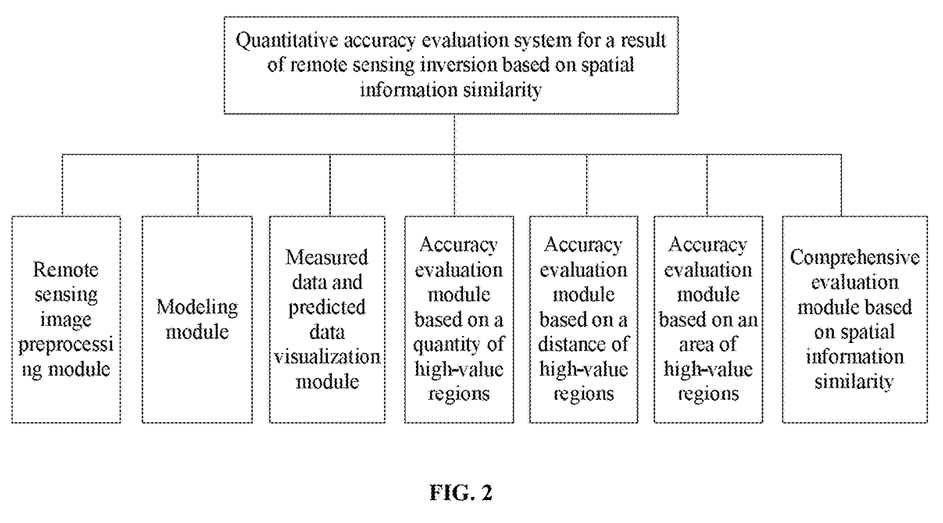
FIG. 2 is a schematic structural diagram of a quantitative accuracy evaluation system for a result of remote sensing inversion according to an embodiment of the present disclosure.

As shown in FIG. 2, the embodiment of the present disclosure further provides a quantitative accuracy evaluation system for a result of remote sensing inversion, the system including:
an acquisition module configured to acquire measured data of a target element content in a preset zone;
an inversion module configured to acquire, based on acquired remote sensing image reflectivity of the preset zone, predicted data of the target element content in the preset zone by a remote sensing inversion model; and
an evaluation module configured to conduct comprehensive index evaluation of abnormal feature similarity on the measured data and predicted data; where the comprehensive index evaluation covers: evaluation accuracy based on a quantity of high-value regions, evaluation accuracy based on a distance of high-value regions and evaluation accuracy based on an area of the high-value regions.

As an implementation of the present disclosure, the evaluation module includes: an accuracy evaluation module based on a quantity of high-value regions, an accuracy evaluation module based on a distance of high-value regions, an accuracy evaluation module based on an area of high-value regions, and a comprehensive evaluation module based on spatial information similarity.

The accuracy evaluation module based on a quantity of high-value regions includes: a counting unit configured to count the quantity of high-value regions of the predicted data and the quantity of high-value regions of the measured data; and a first calculation unit configured to calculate a predicted correct rate, a predicted false rate and a predicted missing rate according to the quantity of the high-value regions, so as to acquire evaluation accuracy based on the quantity of the high-value regions. The accuracy evaluation module based on a quantity of high-value regions is configured to evaluate the consistency in the quantity of predicted high-value regions and the quantity of measured high-value regions; extract the high-value regions of element content from the measured and inversion results, and count the quantity of high-value regions that is correctly inverted, the quantity of high-value regions falsely inverted, and the quantity of high-value regions that fails to be inverted; and calculate the correct rate, the false rate and the missing rate through the ratio calculation.

The accuracy evaluation module based on a distance of high-value regions includes: a first acquisition unit configured to acquire the high-value regions of the predicted data and the high-value regions of the measured data; and a second calculation unit configured to determine whether similarity exists in distribution locations of the high-value regions of the predicted data and the high-value regions of the measured data, so as to acquire the evaluation accuracy based on a distance of high-value regions. The accuracy evaluation module based on a distance of high-value regions is configured to evaluate whether similarity exists in spatial distribution location of prediction results and corresponding measured data, so as to effectively show deviation in the prediction results; according to distribution location of the measured and predicted high-value points of each element in the preset zone, extract the location of a centroid in a high-value region for calculation to obtain the horizontal coordinate $x_i$ and the vertical coordinate $y_i$ of a measured high-value region and the horizontal coordinate $x_j$ and the vertical coordinate $y_j$ of a predicted high-value region; calculate a Euclidean distance between the centroid of the measured high-value region and the centroid of the predicted high-value region, and grade and score the distance between the centroids of the high-value regions according to the research scope and actual measurement distance.

The accuracy evaluation module based on an area of high-value region includes: a second acquisition unit configured to acquire a range of the preset zone; a third calculation unit configured to calculate a degree of area overlapping of the high-value regions of the predicted data and the high-value regions of the measured data based on a range of the preset zone, so as to acquire the evaluation accuracy based on an area of the high-value regions. The accuracy evaluation module based on an area of high-value region is configured to: obtain an overlap index according to the topological relationship between a measured high-value region and a predicted high-value region and the size of an overlap area, so as to obtain an evaluation result based on area accuracy; specifically, determine the topological relationship between the measured high-value region and the predicted high-value region (separation, intersection or inclusion), calculate the overlap area of the measured high-value region and the predicted high-value region, calculate a ratio of the overlap area to the area of the measured region, and finally, obtain the evaluation accuracy based on area-overlap index.

The comprehensive evaluation module based on spatial information similarity is configured to evaluate the comprehensive level of the above evaluation results based on above three aspects of quantity, distance and area; select the average value of the above kinds of accuracy to represent the comprehensive level; the comprehensive evaluation of spatial information similarity can show the consistency between the predicted results and the measured data in spatial distribution, which is helpful to comprehensively understand the inversion accuracy of the high-value region, judge whether the model can be used for inversion, so as to evaluate the reliability of the inversion results.

As an implementation of the present disclosure, the quantitative accuracy evaluation system for a result of remote sensing inversion further includes:
  a remote sensing image preprocessing module configured to conduct corresponding radiometric calibration, atmospheric correction and geometric correction according to different remote sensing images, so as to obtain the remote sensing image reflectivity for the subsequent establishment of the model regarding the element content and reflectivity of the measured points;
  a modeling module configured to establish a model according to the remote sensing image reflectivity and measured element content obtained by the remote sensing image preprocessing module by means of multivariate linear analysis, stepwise multivariate regression, BP neural network and convolution neural network, so as to obtain a predicted value of the target element content in the preset zone; and
  a measured data and predicted data visualization module configured to conduct interpolation analysis on the original measured data and the predicted data obtained by the modeling module by a geostatistical interpolation method, and extract several element contents from the measured and inversion results, so as to realize the visualization of measured data and predicted data.

Embodiment 3

Figure 3:
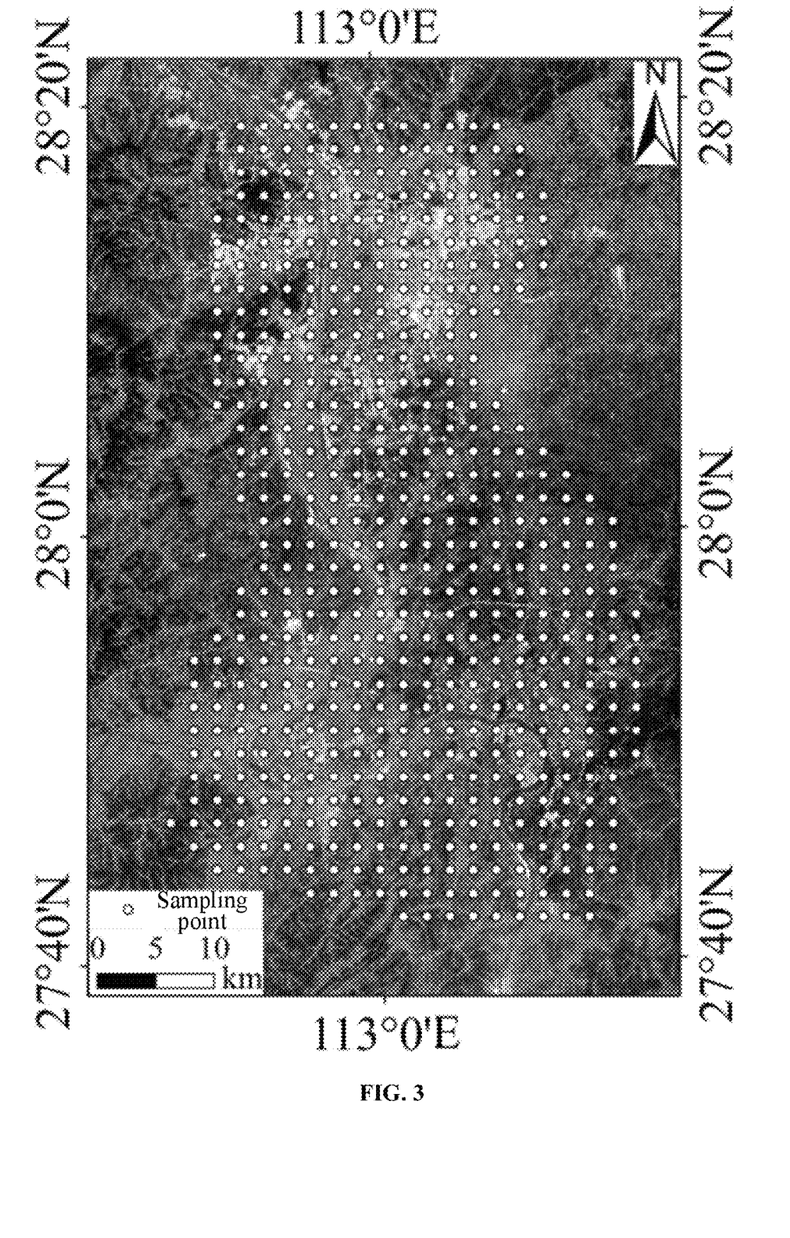
FIG. 3 is a diagram showing distribution of a preset zone and sampling points.

The embodiment of the present disclosure provides a quantitative accuracy evaluation method for a result of remote sensing inversion, which is described below:
Predicted Value Obtained Through Remote Sensing Image Preprocessing and Inverse Modeling FIG. 3 is a diagram showing distribution of a preset zone and sampling points. Select the measured values of heavy metal contents in Changsha-Zhuzhou-Xiangtan regions as the original data, obtain the corresponding Landsat remote sensing data, and in combination with the relevant technical parameters, conduct radiometric calibration, atmospheric correction and geometric correction on remote sensing images; in combination with the measured data of heavy metal elements in Changsha-Zhuzhou-Xiangtan regions obtained in advance, obtain reflectivity at the measured points in the Landsat remote sensing images, and based on the initial measured values and the reflectivity at measured points obtained from the remote sensing images, conduct inverse modeling using different models to obtain a larger range of element contents and predicted values at each point.

Visualization of Measured Data and Predicted Data

Figure 4:
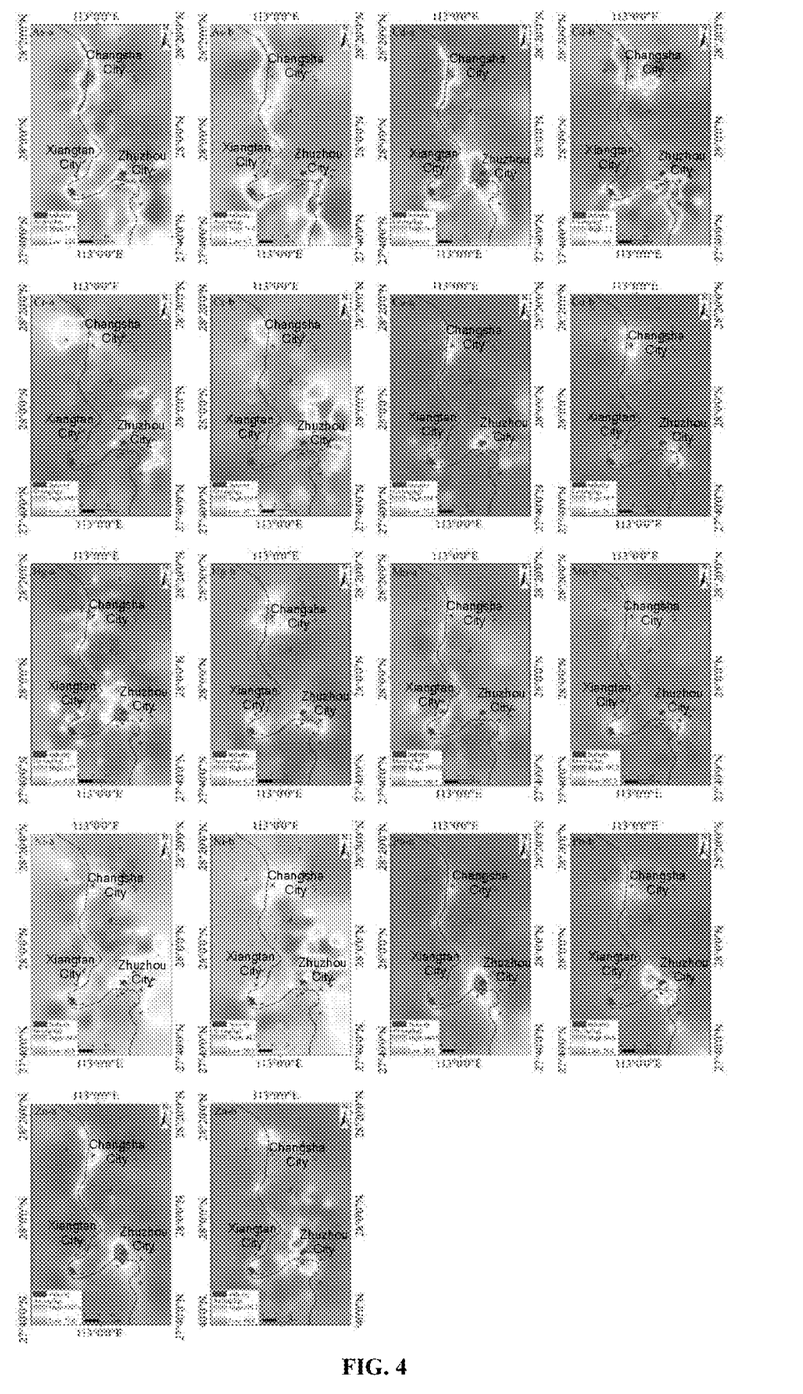
FIG. 4 is a visualization diagram of measured data and predicted data.

FIG. 4 is a visualization diagram of measured data and predicted data for nine elements of As, Cd, Cr, Cu, Hg, Ni, Pb, Mn and Zn. According to the initial measured data and predicted data about an element obtained after inverse modeling, obtain interpolation graphs of the initial measured data and predicted data by geostatistical interpolation methods, such as Kriging interpolation, inverse distance weighted methods and Bayesian interpolation, so as to complete data visualization. In order to achieve a more intuitive evaluation effect than conventional inversion methods, when selecting a predicted value, the visualization method for predicted values adopted in the present disclosure does not need to reproduce the whole remote sensing image through inversion; visualize corresponding predicted values mainly using coordinate positions of measured points corresponding to measured values, so as to facilitate comparison and evaluation.

Accuracy Evaluation Based on the Quantity of High-Value Regions

Screen out high-value regions in the visualization diagrams of measured values and predicted values, select the high-value regions in the diagrams as operation objects, and extract a centroid of each high-value region as a high-value point of the region, which is further used as the judgment criteria for the location of the high-value regions; in a visualization diagram of measured values, a high-value point has a horizontal coordinate of $x_i$ and a vertical coordinate of $y_i$; in a visualization diagram of predicted values, a high-value point has a horizontal coordinate of $x_j$ and a vertical coordinate of $y_j$; after the coordinates of a centroid, namely the high-value point of a high-value region are extracted, calculate indexes of a correct rate, a false rate and a missing rate that are based on the quantity of high-value regions; where the correct rate is a ratio of the quantity of high-value regions that is correctly inverted to the quantity of measured high-value regions for an element, which is expressed as follows:

$$P_{Correct} = \frac{a_c}{A_m}.$$

The false rate is a ratio of the quantity of high-value regions falsely inverted to the total quantity of high-value regions inverted, which is expressed as follows:

$$P_{False} = \frac{a_f}{a_c + a_f}.$$

The missing rate is a ratio of the quantity of high-value regions that fails to be inverted to the quantity of measured high-value regions for an element, which is expressed as follows:

$$P_{Missing} = \frac{a_m}{A_m}.$$

Wherein $P_{Correct}$ denotes a correct rate, $P_{False}$ denotes a false rate, and $P_{Missing}$ denotes a missing rate; $a_c$ denotes a quantity of high-value regions that is correctly inverted, of denotes a quantity of high-value regions falsely inverted, $a_m$ denotes a quantity of high-value regions that fails to be inverted, and $A_m$ denotes a quantity of measured high-value regions of an element; and $P_{Correct}$, $P_{False}$ and $P_{Missing}$ each have a value range of [0, 1].

Figure 5:
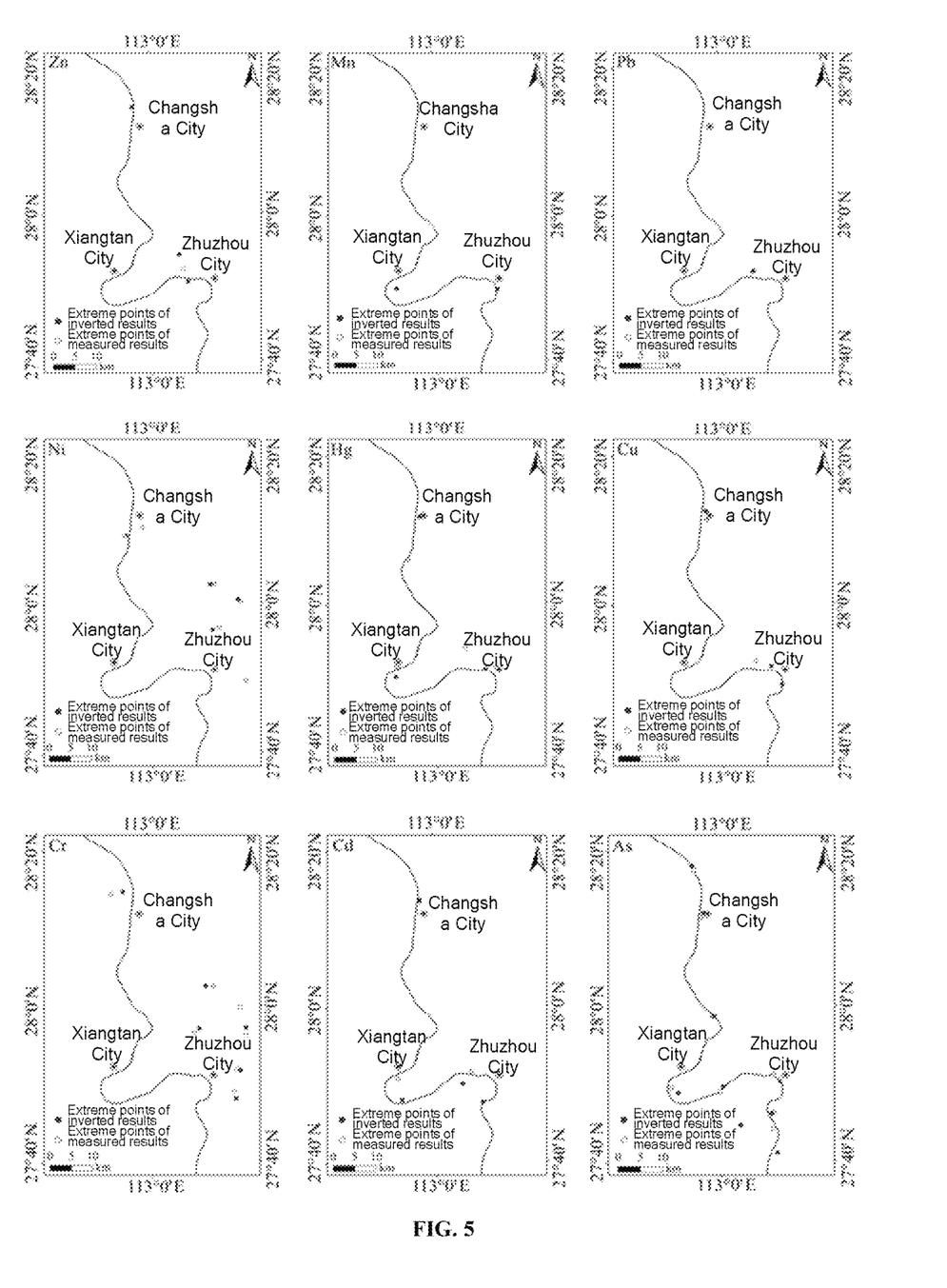
FIG. 5 illustrates the spatial distribution of high-value points of each element measured and predicted.

Table 1 provides inversion accuracy evaluation based on the quantity of high-value regions. FIG. 5 illustrates the spatial distribution of high-value points of each element measured and predicted. There are 7 groups of high-value points correctly inverted for the element As, and 2 high-value points are predicted incorrectly, so the correct rate is 0.88, the false rate is 0.22, and the missing rate is 0.13. There are 3 groups of high-value points correctly inverted for the element Cd, 1 high-value point is predicted incorrectly, and 1 high-value point fails to be inverted, the correct rate is 0.75, the false rate is 0.25, and the missing rate is 0.25. The accuracy of element Cr based on quantity is high, where there are 6 groups of high-value points correctly inverted, 1 high-value point fails to be inverted, the correct rate is 0.86, and the missing rate is 0.14. There are 2 groups of high-value points that are predicted correctly for the element Cu, 1 high-value point is predicted incorrectly, the correct rate is 1, the false rate is 0.33, and the missing rate is 0. There are 3 groups of high-value points correctly inverted for the element Hg, the correct rate is 0.6, and the missing rate is 0.4. There are 4 groups of high-value points that are predicted correctly for the element Ni, 2 high-value points fail to be correctly inverted, the correct rate is 0.67, and the missing rate is 0.33. The correct rate of element Pb based on quantity is 1. In the inversion results of the element Mn, 1 high-value point is predicted incorrectly, a great deviation exists in the location of 1 high-value point, the predicted correct rate is 0, and the false rate is 1. For the element Zn, 2 high-value points are successfully predicted, the correct rate is 1, and the false rate is 0.33.

TABLE 1

| Element | Correct rate | False rate | Missing rate |
| --- | --- | --- | --- |
| As | 1 | 0.11 | 0 |
| Cd | 0.75 | 0.4 | 0.25 |
| Cr | 0.86 | 0.14 | 0.14 |
| Cu | 1 | 0.33 | 0 |
| Hg | 0.6 | 0 | 0.4 |
| Ni | 0.67 | 0 | 0.33 |
| Pb | 1 | 0 | 0 |
| Mn | 0 | 1 | 0 |
| Zn | 1 | 0.33 | 0 |

Accuracy Evaluation Based on the Distance of High-Value Regions

Screen out high-value regions in the visualization diagrams of measured values and predicted values, select the high-value regions in the diagrams as operation objects, extract a centroid of each high-value region, and calculate a Euclidean distance between the centroids of the measured high-value regions according to the following calculation formula: $Dist=\sqrt{(x_i-x_j)^2+(y_i-y_j)^2}$. Where Dist denotes a distance between centroids, $x_i$ and $y_i$ denote horizontal and vertical coordinates of a centroid in a measured high-value region, respectively, and $x_j$ and $y_j$ denote horizontal and vertical coordinates of a centroid in a predicted high-value region; the smaller the distance between centroids is, the higher the positional accuracy becomes.

Figure 7:
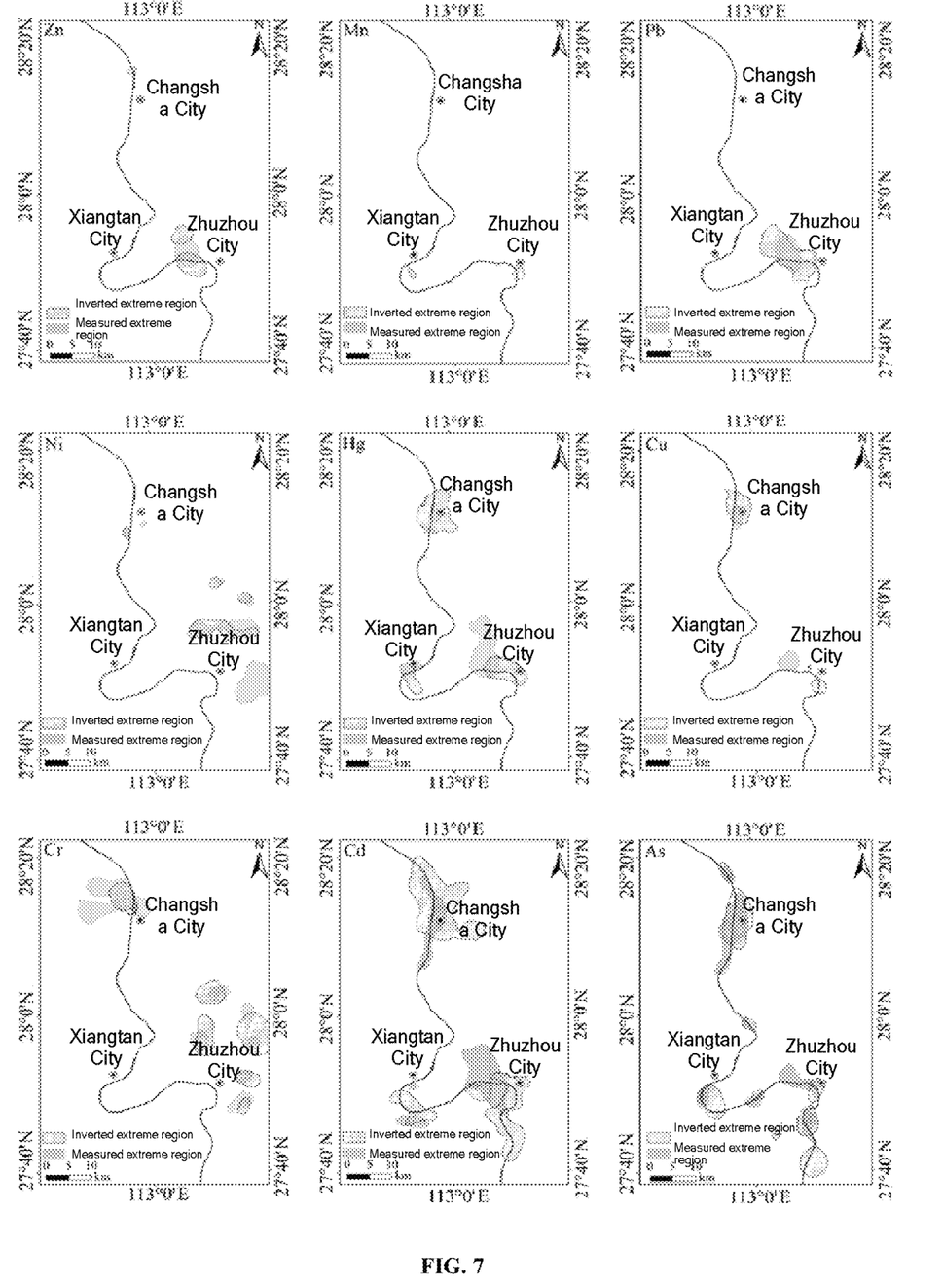
FIG. 7 illustrates the distribution of regions which have a high measured content and a high predicted content of an element.

Table 2 provides inversion accuracy evaluation based on the distance of high-value regions. According to the range of a preset zone and the actual measured distance, the distance between the centroids of the high-value regions is graded and scored, where 0-0.5 km corresponds to 1, 0.5-1 km corresponds to 0.8, 1-2 km corresponds to 0.6, 2-3 km corresponds to 0.4, 3-4 km corresponds to 0.2, >4 km corresponds to 0, and the average score of each element corresponding to the high-value points is the final evaluation result. As shown in FIG. 7, the distance evaluation results differ greatly. For the elements Pb, Ni, As and Hg, the average distance between the centroids in the high-value regions is less than 2 km. Regarding the element As, the centroids have an average distance of 1241.8 m, a maximum distance of 2195 m, and a minimum distance of 394.6 m. Regarding the element Hg, the centroids have an average distance of 1820.5 m, a maximum distance of 2558 m, and a minimum distance of 386.3 m. Regarding the element Ni, the centroids have an average distance of 1010.8 m, a maximum distance of 1587 m, and a minimum distance of 366.2 m. For the element Pb, there is only one group of high-value points, and the average distance, the maximum distance and minimum distance are all 164.7, indicating very small deviation. For the elements Mn, Cd and Zn, the average distance between the centroids in the high-value regions is greater than 5 km. Regarding the element Cd, the centroids have an average distance of 5725.1 m, a maximum distance of 8766.3 m, and a minimum distance of 3522.2 m. Regarding the element Cr, the centroids have an average distance of 2767.1 m, a maximum distance of 4811.4 m, and a minimum distance of 1618.5 m. Regarding the element Cu, the centroids have an average distance of 3476.1 m, a maximum distance of 4699.2 m and a minimum distance of 2253.1 m. Regarding the elements Mn and Zn, the average distances are 6315.2 m and 5047.3 m, respectively. Moreover, as to the element Zn, the maximum distance is 6665.7 m, and the minimum distance is 3371.1 m. On the whole, the preset zone covers a large range, and there is small deviation in the distance between the centroids of the predicted high-value regions and the distance between the centroids of the measured high-value regions for each heavy metal element. Accuracy evaluation based on the distance is performed well in the elements As, Cr, Hg, Ni and Pb elements, with a score higher than 0.5 for each element. Accuracy evaluation is performed worst in the element Mn, given the large deviation between the location of a predicted high-value point and the location of a measured high-value point. For the elements Cd and Zn, the location of a predicted high-value point also deviates greatly from the location of a measured high-value point, and the accuracy evaluation only scores 0.2.

TABLE 2

| Element | Score | Average distance/m | Maximum distance/m | Minimum distance/m |
| --- | --- | --- | --- | --- |
| As | 0.73 | 1241.8 | 2195.0 | 394.6 |
| Cd | 0.1 | 5725.1 | 8766.3 | 3522.2 |
| Cr | 0.53 | 2527.8 | 4811.4 | 1618.5 |
| Cu | 0.2 | 3476.1 | 4699.2 | 2253.1 |
| Hg | 0.6 | 1820.5 | 2559.0 | 386.3 |
| Ni | 0.7 | 1010.8 | 1587.0 | 366.2 |
| Pb | 1 | 164.7 | 164.7 | 164.7 |
| Mn | 0 | 6315.2 | 6315.2 | 6315.2 |
| Zn | 0.1 | 5047.3 | 6665.7 | 3371.1 |

Accuracy Evaluation Based on the Area of High-Value Regions

When accuracy evaluation is carried out around region-based objects, the range of objects needs to be taken into account.

Figure 6:
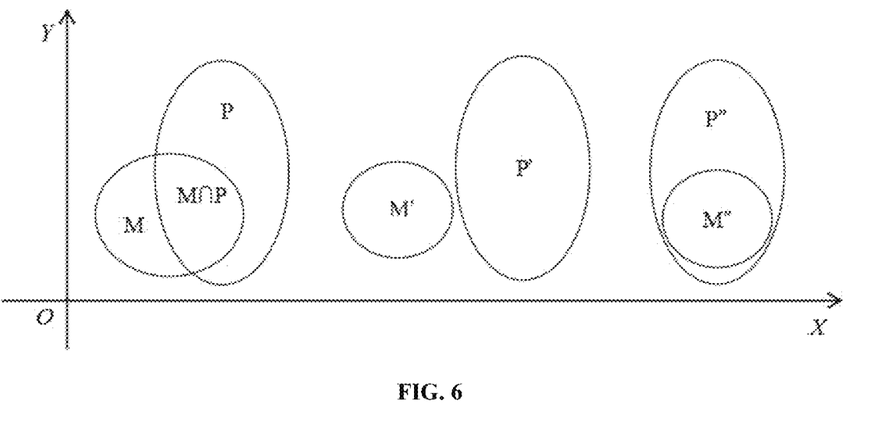
FIG. 6 illustrates a topological relation of regions in space.

FIG. 6 illustrates a topological relation of regions in space. As shown in this figure, there are mainly three kinds of topological relations between two regions in space, including intersection, separation and inclusion, where M represents a measured region, P represents a predicted region, and M∩P represents an intersecting range of corresponding regions. The larger the M∩P is, the higher the overlap degree between the two regions is, the more similar the predicted range is to the measured range are.

FIG. 7 illustrates the distribution of regions which have a high measured content and a high predicted content of an element; the consistency in the area of high-value regions is evaluated by the overlap index, and the overlapping area between the high-value region and the measured high-value region is calculated and compared with the range of the measured high-value region.

A calculation formula of an overlap factor $P_{OF}$ is as follows:

$$P_{OF} = \frac{S_{M \cap P}}{S_M}.$$

Where $S_{M \cap P}$ denotes an area of an intersecting region of a measured high-value region and a predicted high-value region, and $S_m$ denotes an area of the measured high-value region. The OF has a value range of [0,1], and 0.5 is taken as the threshold; when $S_{M \cap P}$ is 0 and OF=0, it indicates that the two high-value regions are separated and there is no intersecting region; the closer the OF is to 1, the larger the overlap area between the two regions is, and the higher the accuracy becomes.

On the whole, there exists certain difference in shape of the spatial distribution of the inverted high-value regions and measured high-value regions extracted from each element and their overlapping area on the whole, and it is obvious that among the overlapping areas of predicted results and measured results, the overlapping area of the two high-value regions for the element As is larger, with an OF of 0.7; for the element Cd, the OF is 0.54, which indicates that the overlapping area of the large-area high-value regions in the northwest of Zhuzhou City is small; the overlap index for the element Cr is 0.4; the overlap index for the element Cu is 0.31, which indicates that there is a large position deviation in the inversion result of high-value regions of the element Cu in Zhuzhou City; the overlap index for the element Hg is 0.36, indicating that there is also a large deviation in the predicted result of high-value regions of the element Hg in Zhuzhou City; the overlap index for the element Ni is 0.29, and failure in predicting measured high-value regions only occurs in the southeast of Zhuzhou City, which, however, has a great influence on the accuracy of OF; the overlap index for the element Pb is 0.85, and there exists only one high-value region in northwest of Zhuzhou City, which is successfully inverted by the prediction result; regarding the element Mn, the measured high-value region covers a small area and is located in the north of Xiangtan City, the predicted high-value region is located in the south of Xiangtan City, and the two regions are separated; the high-value region of Zhuzhou City is falsely predicted, and the overlap index is 0; regarding the element Zn, the measured high-value region is in the northwest of Zhuzhou City, and the two predicted high-value regions exist in the northwest of Zhuzhou City, and both of them intersect with the measured high-value region, and the OF of Zn element is 0.52. There are obvious differences between results derived from the area-based accuracy evaluation and the results derived from other methods. The quantity of predicted high-value regions is consistent with the number of measured high-value regions, and the high-value regions are relatively closely distributed in space, but there is a large deviation between the range of the predicted high-value regions and the range of the measured high-value regions, since the overlap factor (OF) of As, Cd, Pb and Zn elements is higher, while OF values of other elements are less than 0.5.

Comprehensive Evaluation Based on Spatial Information Similarity

For the accuracy evaluation results in the above three aspects of quantity, distance and area, an index is used to represent the comprehensive level of spatial accuracy, where the average value of all kinds of accuracy is usually used to represent the comprehensive level; and the comprehensive evaluation index is obtained according to the following formula:

$$P = \frac{P_1 + P_2 + \ldots + P_N}{N}.$$

Where $P_N$ denotes an Nth individual evaluation index, and P denotes a comprehensive evaluation index.

As shown in the evaluation results of the above methods, the model test is proved to be efficient in testing elements As and Pb, with comprehensive evaluation indexes of 0.81 and 0.95, respectively. There is a certain deviation between the predicted results and the measured results for element Mn. The comprehensive indexes of elements Cd and Hg are lower, which is consistent with the model test results, but their spatial distribution is similar. The comprehensive evaluation indexes of other elements are all higher than 0.5, and the spatial distribution of the predicted high-value regions of each element is consistent with the measured data.

The quantitative accuracy evaluation method and system for a result of remote sensing inversion according to the present disclosure overcomes defects in the prior art that a conventional evaluation model is merely based on numerical evaluation; measured results and predicted results can both be visualized, and overall evaluation is conducted; and besides, a variety of evaluation indexes are adopted, such that evaluation results are more reliable.

The technical solutions of the embodiments of the present disclosure are clearly and completely described below with reference to the accompanying drawings. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

What is claimed is:

1. A quantitative evaluation method for a prediction result of remote sensing inversion, comprising the following steps:
   acquiring measured data of a target element content in a preset zone;
   acquiring, based on acquired remote sensing image reflectivity of the preset zone, predicted data of the target element content in the preset zone by a remote sensing inversion model; and conducting comprehensive index evaluation of abnormal feature similarity between the measured data and the predicted data, specifically comprising:

conducting visualized interpolation color segmentation on the measured data using a geostatistical method to obtain a measured element anomaly distribution map; processing remote sensing data using the remote sensing inversion model to obtain a predicted element content; and conducting interpolation and color segmentation using a geostatistical method for visualization to obtain a predicted element anomaly distribution map; and regarding high-value regions of measured data and predicted data, extracting relevant parameters of measured and predicted element anomalies such as abnormal location, quantity, size and shape, wherein the relevant parameters are configured to calculate the similarity between measured and predicted element anomalies; wherein the comprehensive index evaluation covers: evaluation accuracy based on a quantity of high-value regions, evaluation accuracy based on a distance of the high-value regions and evaluation accuracy based on an area of the high-value regions;

wherein the evaluation accuracy based on a quantity of high-value regions is acquired by comparing high-value regions of the predicted data with high-value regions of the measured data, counting the quantity of the high-value regions of the predicted data and the quantity of the high-value regions of the measured data, and calculating a predicted correct rate, a predicted false rate and a predicted missing rate.

2. The quantitative evaluation method for a prediction result of remote sensing inversion according to claim 1, wherein the evaluation accuracy based on a distance of high-value regions is acquired by determining whether similarity exists in distribution locations of the high-value regions of the predicted data and the high-value regions of the measured data.

3. The quantitative evaluation method for a prediction result of remote sensing inversion according to claim 1, wherein the evaluation accuracy based on an area of the high-value regions is acquired by calculating a degree of area overlapping of the high-value regions of the predicted data and the high-value regions of the measured data based on a range of the preset zone.

* * * * *